(12) United States Patent
Salim (10) Patent No.: US 11,075,736 B2
(45) Date of Patent: Jul. 27, 2021

(54) ADDITIONAL DATA FOR DEMODULATION REFERENCE SIGNAL AND EFFICIENT SIGNALLING FOR DATA MULTIPLEXING IN CONTROL REGION

(71) Applicant: JRD COMMUNICATION (SHENZHEN) LTD, Guangdong (CN)

(72) Inventor: Umer Salim, Guangdong (CN)

(73) Assignee: JRD COMMUNICATION (SHENZHEN) LTD, Guangdong (CN)

(*) Notice: Subject to any disclaimer, the term of this patent is extended or adjusted under 35 U.S.C. 154(b) by 0 days.

(21) Appl. No.: 16/617,464

(22) PCT Filed: Sep. 10, 2018

(86) PCT No.: PCT/CN2018/104905
§ 371 (c)(1),
(2) Date: Nov. 26, 2019

(87) PCT Pub. No.: WO2019/047957
PCT Pub. Date: Mar. 14, 2019

(65) Prior Publication Data
US 2020/0235886 A1 Jul. 23, 2020

(30) Foreign Application Priority Data

Sep. 11, 2017 (GB) .................................. 1714570

(51) Int. Cl.
*H04L 5/00* (2006.01)
*H04L 27/26* (2006.01)
*H04W 72/04* (2009.01)

(52) U.S. Cl.
CPC ............ *H04L 5/0053* (2013.01); *H04L 5/001* (2013.01); *H04L 5/0094* (2013.01); *H04L 27/2613* (2013.01); *H04L 27/2666* (2013.01); *H04W 72/042* (2013.01); *H04W 72/0446* (2013.01)

(58) Field of Classification Search
CPC ..... H04L 5/0053; H04L 5/001; H04L 5/0094; H04L 27/2613; H04L 27/2666; H04W 72/042; H04W 72/0446
USPC ........................................................ 370/329
See application file for complete search history.

(56) References Cited

U.S. PATENT DOCUMENTS

| 2008/0062944 A1* | 3/2008 | Smith | H04L 1/1887 370/342 |
| 2008/0310363 A1 | 12/2008 | McBeath et al. | |
| 2013/0157660 A1* | 6/2013 | Awad | H04W 72/0406 455/435.1 |

(Continued)

FOREIGN PATENT DOCUMENTS

WO 2016/161957 A1 10/2016

OTHER PUBLICATIONS

Huawei, HiSilicon, "Resource multiplexing between PDCCH and PDSCH", 3GPP TSG RAN WG1 Meeting AH_NR#3, R1-1715566, Sep. 18-21, 2017.

*Primary Examiner* — Peter G Solinsky
(74) *Attorney, Agent, or Firm* — BakerHostetler (57) ABSTRACT

Methods for the transmission of data in a cellular communications network. Resource sets are configured for a user equipment and subsequent indications may be provided that configured resource sets can be utilised for data transmission. Improved transmission of demodulation reference signals is also provided.

11 Claims, 5 Drawing Sheets

(56) References Cited

U.S. PATENT DOCUMENTS

2015/0237523 A1 8/2015 Chun et al.
2018/0324816 A1* 11/2018 Islam ................ H04W 72/042

* cited by examiner

Figure 1: Configuration Type 1 for 1-symbol DMRS, Comb 2 + 2 CS, up to 4 ports.

Figure 2: Configuration Type 2 for 1-symbol DMRS, 2-FD OCC, up to 6 ports.

Figure 3: Additional DMRS Location - 3GPP R1-90 Chairman Report

Figure 4: Proposal for one additional Data DMRS in the control region

Figure 5: Additional DMRS in the Control Region

US 11,075,736 B2

ADDITIONAL DATA FOR DEMODULATION REFERENCE SIGNAL AND EFFICIENT SIGNALLING FOR DATA MULTIPLEXING IN CONTROL REGION

CROSS-REFERENCE TO RELATED APPLICATIONS

This application is a National Stage of International patent application PCT/CN2018/104905, filed on Sep. 10, 2018, which claims priority to foreign Great Britain patent application No. GB 1714570.7, filed on Sep. 11, 2017, the disclosures of which are incorporated by reference in their entirety.

TECHNICAL FIELD

Embodiments of the present invention generally relate to wireless communication systems and in particular to devices and methods for enabling a wireless communication device, such as a User Equipment (UE) or mobile device to access a Radio Access Technology (RAT) or Radio Access Network (RAN), particularly but nor exclusively [B].

BACKGROUND

Wireless communication systems, such as the third-generation (3G) of mobile telephone standards and technology are well known. Such 3G standards and technology have been developed by the Third Generation Partnership Project (3GPP). The $3^{rd}$ generation of wireless communications has generally been developed to support macro-cell mobile phone communications. Communication systems and networks have developed towards a broadband and mobile system.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

A. NR Services and Slots/Mini-Slots

The 5G standard will support a multitude of different services each with very different requirements. Those services include Enhanced Mobile Broadband (eMBB) for high data rate transmission, Ultra-Reliable Low Latency Communication (URLLC) for devices requiring low latency and high link reliability and Massive Machine-Type Communication (mMTC) to support a large number of low-power devices for a long life-time requiring highly energy efficient communication.

To maintain varying levels of quality of service (QoS) requirements demanded by these plethora of services, the 5G standard must allow a flexible and scalable design to support those various requirements at the same time.

NR supports slot based scheduling and communication in a flavor very close to LTE. On top of that, mini-slots have been standardized in NR to accommodate low latency and/or small packet size requirements. When data for URLLC services appears after the slot scheduling decisions have been made at the gNB scheduler (and DCI prepared), to satisfy low latency requirements this data would be sent in the form of a mini-slot along with its control information.

Due to relatively small time-frequency resources available for mini-slot, multiplexing of data in the control region of mini-slot is of prime importance.

B. 3GPP Design for Data DMRS

Figure 1:
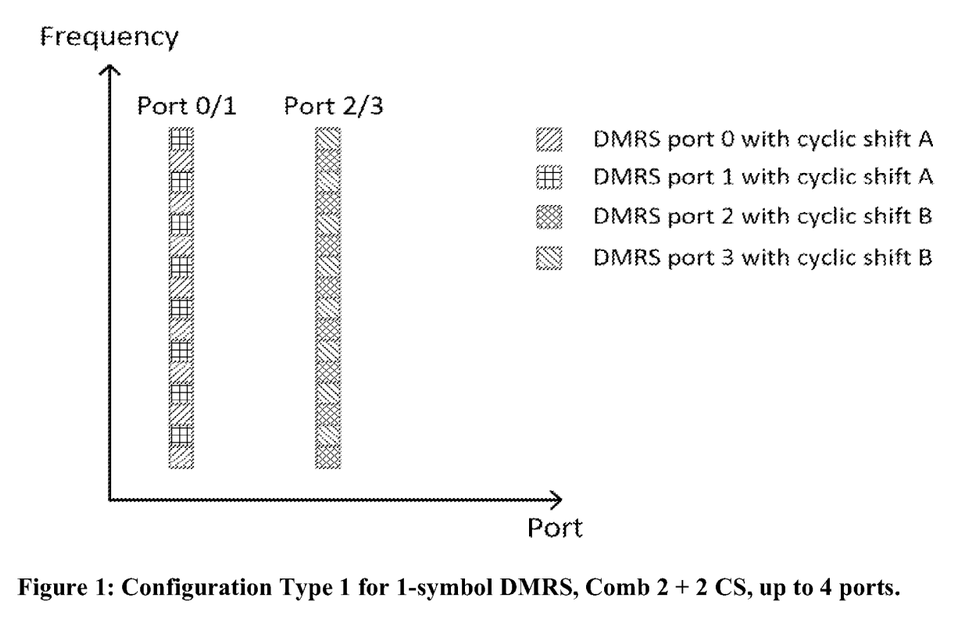
FIG. 1 shows configuration type 1 for 1-symbol DMRS.

For a single OFDM symbol with DMRS, two configuration types have been agreed. Configuration type 1 is shown in FIG. 1 and is based on multiplexing two antenna ports in a comb-like fashion in frequency domain. Furthermore, 2 different cyclic shifts (CS) are utilized to allow for up to 4 antenna ports.

Figure 2:
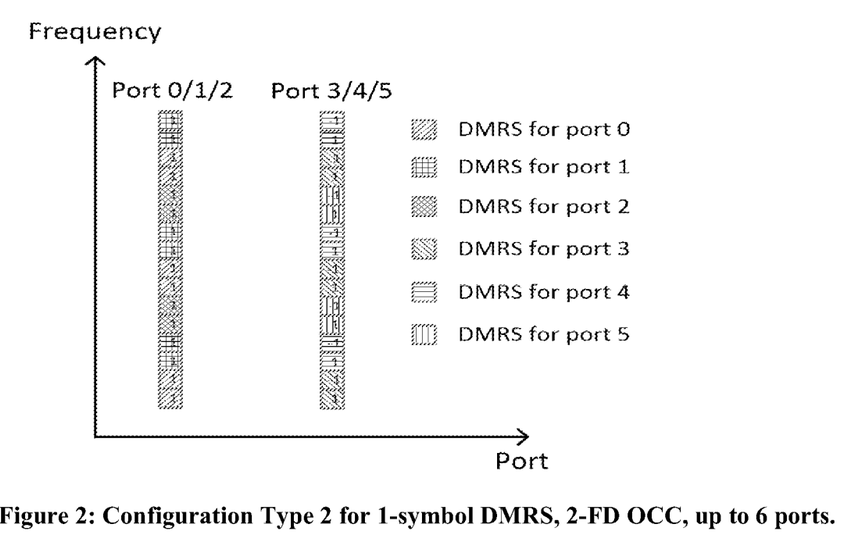
FIG. 2 shows configuration type 2 for 1-symbol DMRS.

FIG. 2 shows configuration type 2 which is based on frequency-domain (FD) orthogonal cover codes (OCC) of 2 adjacent resource elements (RE). This design supports up to 6 antenna ports.

C. NR Control Information Through CORESETs

Contrary to LTE where there is a clear time split between control (PDCCH region) and data (PDSCH), in NR the control information will be sent to users through different CORESETs in the control region. Due to availability of very wide-bandwidth carriers in NR, CORSET may not occupy the whole control region all the time. To achieve good spectral efficiencies, NR has already agreed to multiplex the data over the control resources. A UE is configured by the gNB to monitor one or multiple CORESETs but will not know the presence and precise location of CORESETs for which it is not configured. Similarly, a CORESET may consist of certain time frequency resources to accommodate potentially the control information for several users. But all these users may not have control information necessarily in each scheduling interval. This will result in partially used CORESETs which also implies inefficient use of time-frequency system resources.

D. 3GPP Agreements for NR Slots and Mini-Slots
3GPP TR38.912 v1.0.0 (2017-03)

A slot is defined as 7 or 14 OFDM symbols for the same subcarrier spacing of up to 60 kHz with normal CP and as 14 OFDM symbols for the same subcarrier spacing higher than 60 kHz with normal CP. A slot can contain all downlink, all uplink, or {at least one downlink part and at least one uplink part}. Slot aggregation is supported, i.e., data transmission can be scheduled to span one or multiple slots.

Mini-slots having the following lengths are defined.
At least above 6 GHz, mini-slot with length 1 symbol supported.
Lengths from 2 to slot length −1
For URLLC, at least 2 is supported
Mini-slot can start at any OFDM symbol, at least above 6 GHz. A mini-slot contains DMRS at position(s) relative to the start of the mini-slot.
Remove the support for 7-symbol slots from NR
It is allowed to have more than one DL/UL switching points within a 14-symbol slot by using non-slot-based scheduling
Note: at least 14-symbol, 7-symbol, and 2-symbol CORESET monitoring periodicities are supported for non-slot-based scheduling
Removing 7-symbol slot does not imply to remove the agreed design of 4- to 7-symbol long PUCCH
Allow additional DMRS position with non-slot based scheduling
E. 3GPP Agreements Relevant to Large Carrier Bandwidth
From RAN1 specification perspective, maximum channel bandwidth per NR carrier is 400 MHz in Rel-15
Note: final decision on the value is up to RAN4

From RAN1 specification perspective, at least for single numerology case, candidates of the maximum number of subcarriers per NR carrier is 3300 or 6600 in Rel-15
  FFS: For mixed numerology case, the above applies to the lowest subcarrier spacing
  Note: final value for a given channel BW is up to RAN4 decision
From RAN1 specification perspective, the maximum number of NR carriers for CA and DC is 16
  Note that 32 is considered from RAN2 specification perspective
  The number of NR CCs in any aggregation is independently configured for downlink and uplink
NR channel designs should consider potential future extension of the above parameters in later releases, allowing Rel-15 UE to have access to NR network on the same frequency band in later releases A. 3GPP Agreements for Control Information Transmission (CORESET and Search Spaces)

Agreements (RAN1 #87):
  The time/freq. resource containing at least one search space is obtained from MIB/system information/implicitly derived from initial access information
  Time/freq. resource containing additional search spaces, can be configured using dedicated RRC signalling
  Other solution is not precluded Agreements (RAN1 #AH1):
  NR supports a 'group common PDCCH' carrying information of e.g. the slot structure.
    If the UE does not receive the 'group common PDCCH' the UE should be able to receive at least PDCCH in a slot, at least if the gNB did not transmit the 'group common PDCCH'.
    The network will inform through RRC signalling the UE whether to decode the 'group common PDCCH' or not
    Common does not necessarily imply common per cell.
    Continue the discussion on the detailed content of the 'group common PDCCH' including usage for TDD and FDD
  The term 'group common PDCCH' refers to a channel (either a PDCCH or a separately designed channel) that carries information intended for the group of UEs.

Agreements: (RAN1 #89)
  In time domain, a CORESET can be configured with one or a set of contiguous OFDM symbols
    The configuration can indicate the starting OFDM symbol and time duration
  A CORESET is configured with only one CCE-to-REG mapping Working Assumptions: (RAN1 #89)
  For a time-duration of a CORESET:
    Support 1-3 OFDM symbol as time duration for a CORESET on the NR carrier with less than or equal to X PRBs
    Support 1-2 OFDM symbol as time duration for a CORESET on the NR carrier with wider than X PRBs
    FFS: X values
    FFS: Other time duration
    FFS: Relationship of a first PDSCH DMRS symbol with one or more symbols of a CORESET for slot-based scheduling
  FFS: restriction in the certain conditions Agreements (RAN1 #AH2):
  For a 1-symbol CORESET with interleaving,
  At least REG bundle size=2 is supported
  Working assumption:
    REG bundle size=6 is also supported
    FFS whether configuration between 2 and 6 is explicit or implicit
    Precoder granularity in frequency domain is equal to the REG bundle size in the frequency domain
  For a 2 or 3 symbol CORESET with interleaving,
  At least REG bundle size=CORESET length is supported
  Working assumption:
    REG bundle size=6 is also supported
    FFS whether configuration between CORESET length and 6 is explicit or implicit
    Precoder granularity in frequency domain is equal to the REG bundle size in the frequency domain Agreements (RAN1 #AH2):
  For a CORESET which is configured by UE-specific higher-layer signalling, at least following are configured.
    Frequency-domain resources, which may or may not be contiguous
      Each contiguous part of a CORESET is equal to or more than the size of REG-bundle in frequency
        FFS: exact size and number of contiguous parts for a CORESET
    Starting OFDM symbol
    Time duration
    REG bundle size if the configuration is explicit
    Transmission type (i.e., interleaved or non-interleaved)
    More parameters may be added if agreed
  For a CORESET which is configured by UE-specific higher-layer signalling, at least following is configured.
    Monitoring periodicity
      FFS: it is a configuration per CORESET or per one or a set of PDCCH candidates
      FFS: relation with DRX
      FFS: default/fallback value Agreements (RAN1 #AH2):
  UE is configured with a CORESET to monitor group-common PDCCH.
    When configured, the group-common PDCCH follows the same CORESET configuration (e.g., REG-to-CCE mapping) of the CORESET.
      A group-common PDCCH is formed by an integer number of CCEs.
  The CORESET for the monitored group-common PDCCH carrying SFI can be the same or different from the CORESET for the monitored PDCCH for other types of control signalling.

B. 3GPP Agreements Relevant for Control and Data Multiplexing

Agreements: (RAN1 #87)
  NR should support dynamic reuse of at least part of resources in the control resource sets for data for the same or a different UE, at least in the frequency domain
  FFS if resource reuse can be done in time domain as well
  FFS: DL data DM-RS location in time should not vary dynamically as a consequence of dynamic reuse of control resources for data
  FFS: time/frequency granularity of the resource reuse
  FFS: signaling needed, if any Agreements: (RAN1 NR-Adhoc #1)
  The staring position of downlink data in a slot can be explicitly and dynamically indicated to the UE.
    FFS: signaled in the UE-specific DCI and/or a 'group-common PDCCH'

FFS: how and with what granularity the unused control resource set(s) can be used for data Agreements: (RAN1 #88bis)

The duration of a data transmission in a data channel can be semi-statically configured and/or dynamically indicated in the PDCCH scheduling the data transmission
FFS: the starting/ending position of the data transmission
FFS: the indicated duration is the number of symbols
FFS: the indicated duration is the number of slots
FFS: the indicated duration is the numbers of symbols+slots
FFS: in case cross-slot scheduling is used
FFS: in case slot aggregation is used
FFS: rate-matching details
FFS: whether/how to specify UE behavior when the duration of a data transmission in a data channel for the UE is unknown Agreements (RAN1 #90):

A UE can be configured by RRC signaling with one or more resource set(s)
The UE shall assume that the scheduled PDSCH is rate-matched around the resource set(s) when the scheduled PDSCH overlaps
FFS: exact configuration of a resource set including granularity.

Agreements (RAN1 #90):

A UE can be configured by UE-specific RRC signaling to identify resource set(s) for which the PDSCH may or may not be mapped based on the L1 signaling.
For a scheduled PDSCH overlapping with given resource set(s), L1 signalling indicates whether the scheduled PDSCH is rate-matched around the resource set(s) or is mapped to the resources in the resource set(s).
FFS: details of the L1 signaling
FFS: exact configuration of a resource set including granularity Agreements (RAN1 #90):

At least the following is supported
When the scheduled PDSCH overlaps with the PDCCH scheduling the PDSCH, the UE shall assume that the scheduled PDSCH is rate-matched around the PDCCH scheduling the PDSCH
Other forms of resource sharing between PDCCH and PDSCH are not precluded C. Relevant TDocs with their Proposals For the principal invention of this proposal which proposes to configure an additional data DMRS symbol in the control region, there is no TDoc making any similar proposal. 3GPP made very fast progress in the last meeting in agreeing to configure resource sets through RRC signalling and then using them for data multiplexing dynamically through L1 signalling. Secondly the results shown in DMRS design sessions and the discussions led to the conclusion that extrapolation over more than 2 symbols could be highly compromising. We exploit these two lines of agreements/discussions to make this proposal.

A number of interesting contributions were submitted to latest R1-90 3GPP meeting in Prague on the topic of data multiplexing over the control resources.

All of the above TDocs can be accessed using the following link: http://www.3gpp.org/ftp/tsg_ran/WG1_RL1/TSGR1_90/Docs/R1-171xxxx.zip The present invention is seeking to solve at least some of the outstanding problems in this domain.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect of the present invention there is provided.

Preferably, the Radio Access Network is a New Radio/5G network.

According to a second aspect of the present invention there is provided a base station adapted to perform the method of another aspect of the present invention.

According to a third aspect of the present invention there is provided a UE adapted to perform the method of another aspect of the present invention.

According to a fourth aspect of the present invention there is provided a non-transitory computer readable medium having computer readable instructions stored thereon for execution by a processor to perform the method of another aspect of the present invention.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

In new radio (NR) systems, the use of COntrol REsource SET (CORESET) has been agreed upon, which is a group of physical resource blocks (PRBs) for a certain number of OFDM symbols, to carry control information from the gNB to the users. Due to wide carrier bandwidths available for NR, time and/or frequency portions extending the CORESET can be significant and if left unused may degrade the system spectral efficiency. This necessitates the multiplexing of data (PDSCH) over these resources to improve the spectral efficiency. The present invention proposes how to enable reliable channel estimates for data demodulation in the control region and further discloses efficient signalling mechanisms enabling data multiplexing in the control region.

An important element of the present invention is related to the configuration of the additional data DMRS in the control region. For the data which is embedded in the resource sets in the control region, reliable demodulation would require the presence of channel estimates. As front-loaded data DMRS may be located beyond these (control) resource sets, an extrapolation may be necessary to prepare the channel estimates. The present invention proposes to improve the quality of channel estimates in these (control) resource sets either making use of DMRS of these resource (DMRS embedded for PDCCH) or by allocating additional data (PDSCH) DMRS in these resources or a combination thereof. This invention also discloses efficient RRC and L1 signalling to enable the data multiplexing over the resource sets which could conventionally be reserved for other purposes, e.g., control transmission. It proposes optimized signalling which enables efficient data multiplexing around or inside these resource sets, which might be pre-configured by the network in some cases. The present invention goes clearly beyond the current state of the art. We not only propose a bitmap based design indicating the mapping of bits but further optimized signalling which are actually more important as based upon our understanding 3GPP would be hesitant to put a whole bitmap in the DCI signalling and some form of compressed signalling is likely to win the agreement.

This invention has at least the following effects:

A Method to improve channel estimation in the resource sets (conventionally reserved for other purposes but assigned to data/PDSCH) would enable use of higher MCS, increasing the user throughput and system spectrum efficiency. Without an additional DMRS configured in the control region for high fading scenarios, the user throughput may seriously degrade.

This invention proposes efficient signalling to enable data multiplexing in the resource sets which are not traditionally reserved for data (an example is the control resource sets—CORESETs).

This efficient signalling enables higher throughput with minimal DL control overhead in terms of signalling.

A. Channel Estimation for Data Demodulation in the Control Resources

Figure 3:
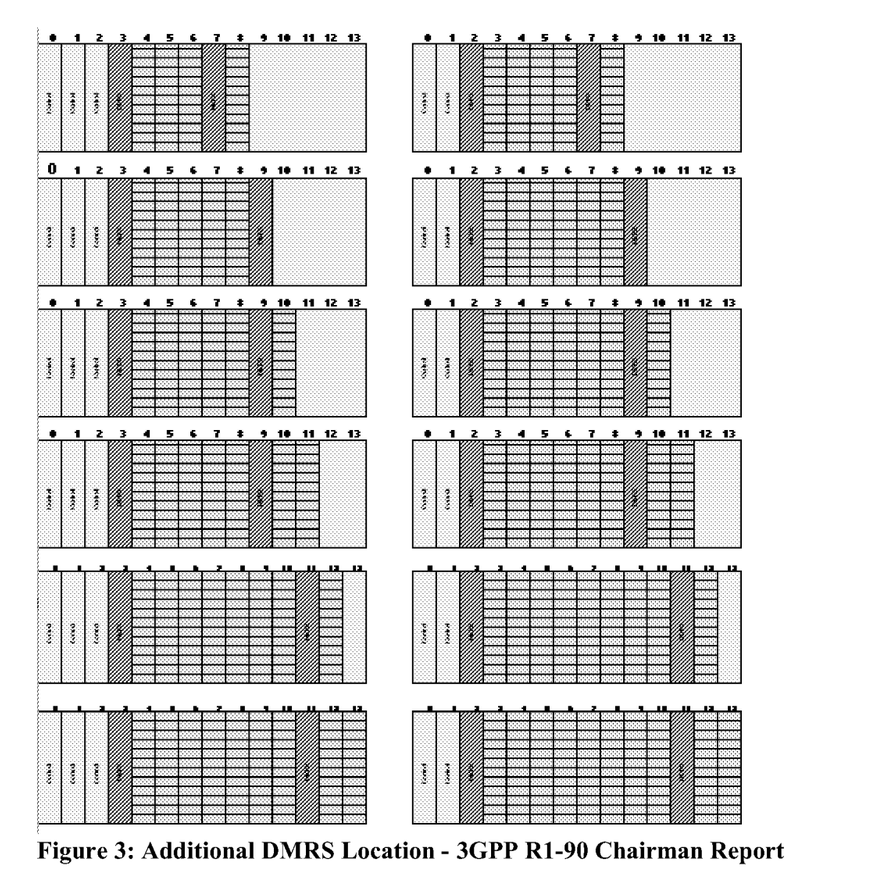
FIG. 3 shows examples of additional DMRS locations.

In normal scheduling operation, whether it is slot based or non-slot based, 3GPP has agreed for front-loaded DMRS for data. Moreover, to cover the case of fast varying channels, the network can configure DMRS symbols additional to the front-loaded DMRS symbol(s). 3GPP has also agreed if there is one additional DMRS symbol after the front-loaded symbol, it would be configured close to the end of the slot such that there are no more than 2 data symbols after this additional DMRS symbol over which extrapolation would be required. This latest agreement from 3GPP RAN1 Prague meeting is shown in FIG. 3: Additional DMRS Location—3GPP R1-90 Chairman Report. The main reason for such a design is that channel estimation extrapolation is much less precise compared to interpolation and may seriously degrade the performance if done for more than 2 consecutive symbols.

FIG. 3 shows Additional DMRS Locations—3GPP R1-90 Chairman Report.

When data is multiplexed in the control region, rate-matched around the CORESETs or mapped inside the CORESET resources, the UE would need to do extrapolation over these symbols for channel estimation with the help of front-loaded data DMRS which are located on 3rd or 4th OFDM symbol of the slot. It will also introduce a significant delay before the UE can process the PDSCH symbols in the control region because it has to wait until the first front-loaded DMRS arrives for channel estimation. If the UE has to count only on the front-loaded DMRS, this extrapolation may compromise severely user throughput and the gNB would either need to use a lower MCS or the link would have an increased BLER. This disclosure proposes two potential solutions to overcome this issue.

i. Additional Data DMRS Configured in the Control Area

There are use cases where the data region of the UE can be extended into the control region without interfering with any CORESET or only interfering with CORESETs known to the UE. To coherently demodulate the PDSCH in the control region, the UE has to extrapolate its channel estimate from the PDSCH region to the control region, i.e. an extrapolation of 1, 2 or 3 symbols if control and data region use the same numerology. In case, data is configured with a different numerology with higher sub-carrier spacing, the extrapolation may need to be done over larger number of symbols.

Figure 4:
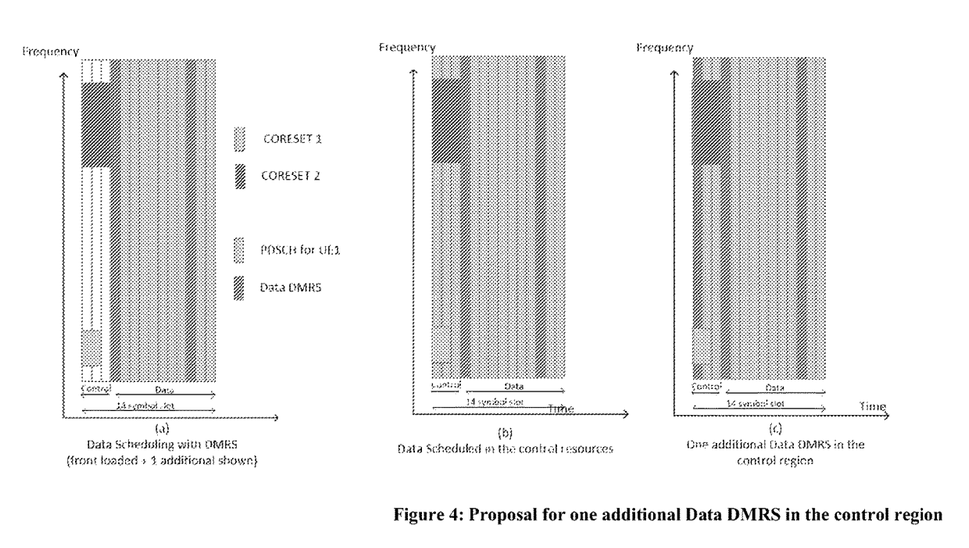
FIGS. 4 and 5 show examples of an additional DMRS in the control region.

FIG. 4 shows a Proposal for one additional Data DMRS in the control region.

FIG. 4 shows a reference slot of 14 symbols. FIG. 4 (a) shows the slot structure where there are 2 CORESETs shown and one user (UE1) is configured for data starting from 4th OFDM symbol. This user has been configured with one DMRS symbol additional to the front loaded DMRS symbol. The additional DMRS symbol is configured at the end of the slot, as per the 3GPP agreement. Please note that the discussion is general and is independent of the number of additional DMRS and their configuration types. FIG. 4 (b) shows the case when the gNB configures the PDSCH for this user in the control resource starting from the first symbol of the slot. The discussion stays independent if user data is multiplexed inside the CORESETs or not or the number of the CORESETs which happen to be overlapping with the PDSCH in the control region. Now the UE needs to do extrapolation of the channel estimates over the first 3 OFDM symbols FIG. 4 (b). For medium to high Doppler scenarios, this channel extrapolation could be quite challenging and the channel estimation error may limit the MCS allocated to this user, or otherwise there will be high BLER for this user. To overcome this issue, FIG. 4 (c) shows the proposed design where the gNB has configured an additional DMRS in the control region for this user, in the first OFDM symbol of the slot. Thanks to this additional DMRS in the control region, the user can obtain high quality channel estimates through interpolation in the control region. One additional benefit of this DMRS symbol in the control region is the improved receiver processing latency. The user does not need to wait for the front-loaded data DMRS (3rd or 4th OFDM symbol) to start its receiver chain. Moreover, if there are multiple code words and mapped in frequency first fashion, the user can continue demodulation and channel decoding without waiting for front loaded DMRS symbols.

On the opposite, if the additional DMRS symbol in control region is not there, the gNB shall allocate data resource at most on the 2 symbols preceding front loaded DMRS to avoid degrading severely the BLER (perhaps even less for high speed cases).

We propose that the network can configure additional PDSCH DMRS symbol(s) even before the front-loaded data DMRS (3rd or 4th OFDM) symbol in the control region over the UE allocated frequency resources.

When the network configures an additional PDSCH DMRS in the control region before the front-loaded DMRS, this is the first symbol in the slot from where user is scheduled.

We further propose that when the network configures an additional PDSCH DMRS in the control region, it follows the same configuration type as of the front-loaded PDSCH DMRS.

We further propose that when the network configures additional PDSCH DMRS in the control region, this additional DMRS is a single symbol DMRS even if the front-loaded and other additional DMRS symbols occupy 2 symbols under the constraint that the DMRS configuration type is such as to accommodate the PDSCH antenna ports within one DMRS symbols.

This proposal would imply that if the network has configured Config Type 1, there would be a single additional DMRS symbol in the control region for up to 4 ports as the DMRS for up to 4 ports can be placed in one DMRS symbol for Config Type 1. Similarly, the gNB should configure a single additional DMRS symbol in the control region for up to 6 antenna ports when Config Type 2 is used for DMRS.

When the data is using more antenna ports than DMRS config Type is able to support in one DMRS symbol, gNB should configure two DMRS symbols like the front loaded DMRS symbols which should start from the first symbol allocated to the UE for PDSCH.

When the network is mapping the user's data inside the CORESETs, this additional DMRS symbol in the control region should have the pilot resource elements inside these CORESETs. In other words, the DMRS should be mapped on all the frequency chunks (PRBs) which have been assigned to the user in the control region.

Figure 5:
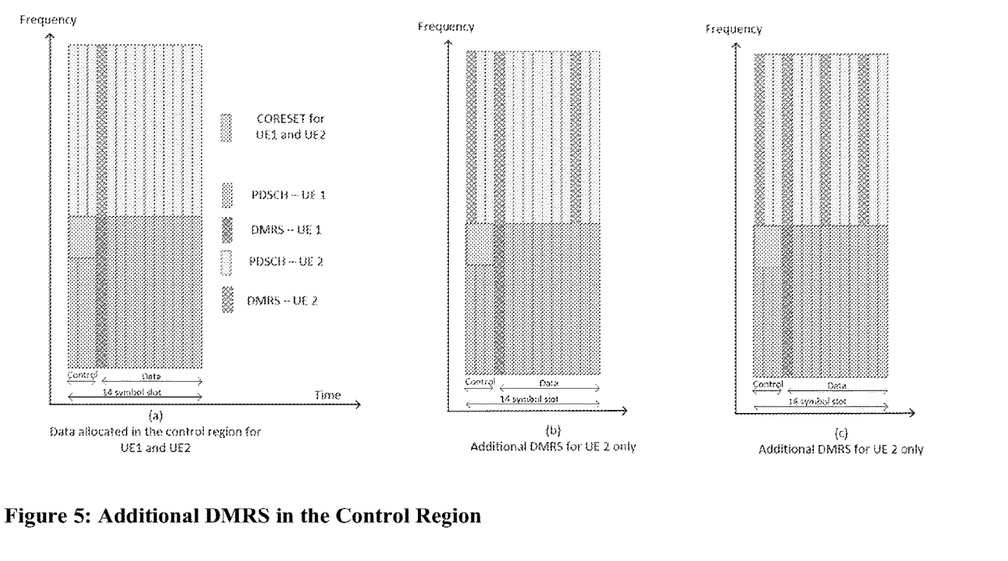

An additional example of the proposal is shown in FIG. 5. FIG. 5 (a) shows the setting where UE1 and UE2 have been allocated data and only front-loaded data DMRS symbol is configured. The data of UE1 overlaps with the CORESET of the two users whereas the frequency allocation of UE2 has no overlap with any CORESET.

FIG. 5 shows an Additional DMRS in the Control Region

In case both UEs are under low mobility conditions, the configuration of front loaded DMRS alone (FIG. 5(a)) may be sufficient to perform reliable channel estimation and data demodulation/decoding. Suppose the channel for UE2 is varying rapidly either because the UE2 is highly mobile or its surroundings have high mobility elements (a person standing close to a motor-way), the gNB may configure one or two additional DMRS symbol(s) for UE2, FIG. 5(b) shows one additional DMRS configured at the end of the slot and one additional DMRS symbol configured in the control region on the first data symbol. FIG. 5(c) shows the setting where the gNB configures two additional DMRS symbols in the data region (one in the middle and one at the end of the slot) and one additional DMRS symbol in the control region. This figure also shows one important point that additional DMRS symbols (including the one in the control region) don't need to be configured over the entire system bandwidth. As these are user specific DMRS, they are only configured on the frequency resources assigned to the relevant UE.

ii. Exploit Control DMRS Present in the CORESETs

Another idea to improve the channel estimation quality in the control resource set for data demodulation is through the use of control DMRS. This can be useful when the antenna port used for control transmission is quasi-collocated with the antenna port used for data transmission. This can also be helpful when the gNB is doing codebook based transmission to the user, so based upon the control DMRS, the user would be able to extract the raw channel estimates and combining them with the known pre-coding vector or matrices, it can estimate the effective composite channel comprising the raw channel with the precoding weights.

As normally a UE would know its configured CORESETs and be informed for the others by the gNB, it should be able to locate DMRS even for the CORESETs for which it is not configured to receive the control information.

We propose that UE exploits the control DMRS (located in CORESETs) overlapping its frequency allocation to improve the channel estimation quality for data demodulation.

iii. Applicability of the Ideas to Some Special System Configurations

Data DMRS in the control region for non-slot based scheduling: This idea of additional PDSCH (data) DMRS configured in the control region is applicable to non-slot based scheduling when applicable. For non-slot based scheduling, when control information is coming along with the data which may happen for both eMBB and URLLC users, data may be multiplexed in the control region. If this is happening in high Doppler conditions, the gNB may configure this additional DMRS in the control region to improve the channel estimation performance.

Data DMRS in the control region for TDD: The proposals made for the improvement of channel estimation either through the exploitation of control DMRS or by the network configuring an additional PDSCH DMRS in the control region are applicable to all modes of TDD, whether static or dynamic. Similarly, they are applicable to both self-contained and non-self-contained architectures.

Data DMRS in the control region for different configurations and number of DMRS symbols: The disclosure has shown some examples with front-loaded data DMRS and one or two additional DMRS symbols where each DMRS location was one OFDM symbol long. The proposal of configuring additional DMRS in the control region made in this disclosure is applicable to all data DMRS configuration types, for any number of additional DMRS, and for both 1 symbol or two symbols front-loaded DMRS cases.

B. Signalling for CORESET Configured for the User

A user might be configured to listen to one or more CORESETs, including common, group common or user specific sets. These CORESETs may schedule this specific user for data at suitable scheduling intervals but not each of these user's configured CORESET would have control information for this specific user at each scheduling interval or each repetition interval of this CORESET.

The network can configure each user to a certain number of CORESETs but the UE has no information about all the CORESETs configured for all purposes and all users in the cell. 3GPP has already agreed in R1-90 that the gNB can inform a user through RRC signalling about one or more resource sets around which its data will be rate matched when scheduled over the overlapping time-frequency resources.

Furthermore, L1 signalling would be required to indicate when the scheduled PDSCH is rate-matched around the CORESET or is mapped to the resources in the resource set.

As far as RRC signalling is concerned, user-specific RRC signalling has already been accepted by 3GPP to inform the user about certain resource sets (or CORESETs), the coordinates of which would be used to multiplex data in the control region. In certain use cases, if UE is not in RRC connected state but the gNB has some pre-indication that this user may become active in some time, it could be beneficial to have the possibility of having this RRC signalling cell specific. Thus, this cell specific RRC signalling would let the user(s) know about the time-frequency positions of the resource sets even before they are in RRC active state and then without some delay, the gNB can schedule the data of these users in the control region.

Support cell specific RRC signalling to inform the user(s) about the resource sets (CORESETs) to enable efficient data multiplexing in the control resources.

When a user has acquired the knowledge of a certain number of resource sets (CORESETs) through (i) configuration to listen the control information in these CORESETs (i.e., the common, group-common and user-specific CORESETs configured to the user), or (ii) explicit information by RRC signalling or other methods, it knows the positions of these CORESETs and the gNB can multiplex the data of this user around these resource sets.

Once a UE has got the information about a certain number of resource sets, the gNB utilizes L1 signalling to inform the user whether its data is rate matched around the configured resource sets or its data is mapped inside. We can differentiate two cases here:

i. User's Configured CORESET Having Control Information (PDCCH) for the User

This covers the case of common, group-common or user specific CORESETs in slots when they carry the control information (PDCCH) for a specific user. 3GPP has agreed that when the scheduled PDSCH overlaps with the PDCCH scheduling the PDSCH, the UE shall assume that the scheduled PDSCH is rate-matched around the PDCCH scheduling the PDSCH. To enable this, no explicit signalling is required. The network can configure the frequency resources and start symbol for PDSCH, letting the UE know that its data is rate matched around its scheduling PDCCH.

We propose to have additional L1 signalling for the CORESET containing user's PDCCH which indicates to UE if its data (PDSCH) is rate matched inside the CORESET around its CCEs. This could be indicated by a single bit flag in the DCI.

ii. User's Configured Resource Sets Having No Control Information for the User

This subsection covers the case of common, group-common or user specific CORESETs in slots when they are not carrying the control information for the user of concern. Similarly, this covers the handling and signalling for the resource sets for which the UE has been exclusively configured for data multiplexing.

For these resource sets, pre-configured to the user, if user's data PDSCH frequency resources overlap with the time-frequency location of this CORESET, the gNB can enable data multiplexing around this CORESET just by scheduling the start of user's data PDSCH in the control zone. As user knows the time-frequency location of the CORESET, upon receiving PDSCH time-frequency scheduling information, UE may assume without any explicit signalling that its data will be rate matched around this CORESET. For the next level of data multiplexing, when the user's data is mapped inside these resource sets, the gNB needs to send L1 signalling.

We propose to have additional L1 signalling which indicates to UE if its PDSCH is mapped inside its configured resource sets not carrying control information in this slot destined to this specific user.

The design of L1 signalling to indicate the UE whether its PDSCH is rate-matched around the configured CORESETs or mapped inside could be in the form of a bitmap such that one bit corresponds to one configured CORESET. The values of the bits corresponding to the CORESETs which overlap with PDSCH scheduling let the user know whether data is rate-matched around this CORESET or mapped inside.

One possibility is that the CORESET may not be carrying any control information for any user, in this case, user's data may be rate-matched around the DMRS of this CORESET.

Another case may occur when there is no control information in this CORESET and additionally there are no control DMRS in this scheduling occasion. This may happen for example when in this timing occasion no user is configured to listen to this CORESET. In this case, there are no control DMRS for this CORESET and the gNB can map the user's data PDSCH over all the resource elements of this CORESET.

For the case when the resource set has only DMRS but no control information for any user in the region overlapping with PDSCH of a specific user, the gNB would schedule the user data and indicate this user that its data is mapped inside this resource set. The UE, knowing the DMRS location for CORESETs, would be able to retrieve its data mapped inside this resource set, rate-matched around its DMRS.

For the other case, when a specific resource set has neither control nor DMRS, this information can be sent to the user in RRC signalling while this resource set is being configured for data multiplexing. Thus, when this resource set is marked to the user that its data would be mapped inside, all the resource elements inside are used for data.

A UE can be sent a field in the form of a bitmap through L1 signalling where each bit corresponds to user data scheduled inside the CORESETs, which can be configured to user for potential control information arrival or informed by the gNB specifically for data multiplexing possibility. When a specific bit indicates the mapping inside a CORESET, the user assumes that The PDSCH is rate-matched around the user's CCEs inside this CORESET if this bit corresponds to the CORESET which carries the scheduling PDCCH.

If the resource set corresponding to this bit is not the one carrying the scheduling PDCCH, the PDSCH is mapped inside this resource set. The UE is informed a-priori using RRC signalling if the mapping inside is to be rate-matched around the DMRS of this resource set or if all the resource elements inside are mapped with user's data.

A UE may be configured to listen to a certain number of CORESETs. When gNB intends to do data transmission for this user and may need to multiplex its data in the control resources, it does not need to explicitly configure these CORESETs through RRC signalling for data multiplexing.

The CORESETs which are configured to a UE to receive control information are not explicitly signalled in RRC signalling for data multiplexing.

Then on top of these, the gNB can configure additional resource sets (which can be CORESETs destined to other users for example) to this user to enable efficient data multiplexing in the control region. Now the overall number of CORESETs, the group containing all the CORESETs to which user is configured to receive control information and the resource sets informed for data multiplexing, can be larger than desired and these would need more signalling load if dynamic L1 signalling follows to indicate rate-matching or mapping inside these resource sets. We have the following proposal to contain this dynamic signalling overhead.

The gNB informs the UE explicitly or implicitly about which of the known/configured resource sets (or CORE- SETs) it would send dynamic L1 signalling. Thus, dynamic L1 signalling may follow for a subset of the user's known resource sets.

Above we proposed that the L1 signalling can be in the form of a bitmap where each single bit is associated to a certain resource set. For a specific user, L1 signalling is not necessarily associated to each CORESET which is known to this UE but the gNB can indicate a subset of the resource sets for which L1 signalling would be sent.

There are certain ideas to optimize the L1 signalling related to these resource sets.

To reduce the overhead of bitmap based signalling where one bit is associated to a single resource set, one optimized design of L1 signalling could be such that there is only a single field in the DCI which indicates to the user whether its data is rate-matched or mapped inside for all the configured CORESETs overlapping its scheduled data (PDSCH). Another design could be where one bit is reserved for CORESET containing user's PDCCH and 1 bit for other overlapping CORESETs.

For L1 signalling to inform user about the rate-matching around or data mapping inside the configured resource sets, the proposal of bitmap signalling and the optimized proposals for compressed signalling are listed in the table below:

| No | Optimized L1 Signalling for data multiplexing in the control resource sets | Comments |
|---|---|---|
| 1 | Bitmap design (N bits for N CORESETs) | Largest flexibility and control to embed data in/around control resources. |
| 2 | 1 bit for CORESET which schedules PDCCH + 1 bit for other resource sets | Optimized signalling with only 2 bits sent in L1 signalling |
| 3 | 1 bit for all resource sets which overlap with the PDSCH | Highly compressed signalling |

It will be appreciated that the present invention may include different applications schemes, methods and examples than those shown and the described embodiments are shown by way of example only.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of transmitting data to a user equipment in a cellular communications network, the method comprising the steps of
   transmitting a signal to the user equipment, the signal indicating at least one resource set configured for the user equipment,
   transmitting a subsequent indication to the user equipment indicating configured resource sets that may be utilised for transmission of data to the UE, and transmitting a further indication to the UE indicating in relation to which of the configured resource sets layer 1 signalling will be sent to the UE;
   wherein the indication is transmitted as a bitmap such that each bit corresponds to at least one resource set configured for the user equipment, the bitmap being transmitted via layer 1 signalling.

2. The method according to claim 1, further comprising the step of transmitting data to the user equipment, wherein the data is rate-matched around at least one resource set configured for the user equipment, but not indicated as being utilised for transmission of data in the subsequent indication.

3. The method according to claim 1, further comprising the step of transmitting data to the user equipment, wherein the data is transmitted at least partly within a resource set indicated as being configured for the user equipment and as being available to be utilised for transmission of data in the subsequent indication.

4. The method according to claim 1, wherein the at least one resource set configured for the user equipment is a control resource set.

5. The method according to claim 1, further comprising the step of transmitting an indication of a subset of configured resource sets which may be indicated as being available for utilisation for transmission of data to the user equipment.

6. The method according to claim 1, wherein bits of the bitmap correspond to a subset of assigned resource sets.

7. The method according to claim 1, wherein the bitmap comprises two bits, a first bit relating to a resource set containing the PDCCH and a second bit relating to other resource sets.

8. The method according to claim 1, wherein the signals and indications to the user equipment is transmitted from a gNB in a cellular network to a user equipment connected to that cellular network by a wireless communications link.

9. The method according to claim 1, wherein the data is carried on a PDSCH channel.

10. The method according to claim 1, wherein each bit of the bitmap corresponds to a group of configured resource sets.

11. The method according to claim 1, wherein the subsequent indication is transmitted using a single bit associated with a subset of configured resource sets.

* * * * *